United States Patent
Hainz et al.

(10) Patent No.: US 8,075,683 B2
(45) Date of Patent: Dec. 13, 2011

(54) ISOMETRIC ISOINDOLINE YELLOW PIGMENT

(75) Inventors: Rüdiger Hainz, Binzen (DE); Jean Allaz, Aesch (CH); Didier Schroeder, Huningue (FR)

(73) Assignee: BASF SE Ludwigshafen (DE)

( * ) Notice: Subject to any disclaimer, the term of this patent is extended or adjusted under 35 U.S.C. 154(b) by 0 days.

(21) Appl. No.: 12/744,742

(22) PCT Filed: Dec. 8, 2008

(86) PCT No.: PCT/EP2008/067011
§ 371 (c)(1),
(2), (4) Date: Oct. 15, 2010

(87) PCT Pub. No.: WO2009/074533
PCT Pub. Date: Jun. 18, 2009

(65) Prior Publication Data
US 2011/0023754 A1    Feb. 3, 2011

(30) Foreign Application Priority Data

Dec. 10, 2007 (EP) .................................. 07122749
Jun. 2, 2008 (EP) .................................. 08157426

(51) Int. Cl.
C09B 67/14 (2006.01)
C09B 67/20 (2006.01)
C09B 57/04 (2006.01)
C08K 5/00 (2006.01)

(52) U.S. Cl. ......... 106/498; 524/101; 544/284; 544/300
(58) Field of Classification Search ................. 106/498; 544/284, 300; 524/101
See application file for complete search history.

(56) References Cited

U.S. PATENT DOCUMENTS

| | | | |
|---|---|---|---|
| 4,116,959 A * | 9/1978 | von der Crone | 544/284 |
| 4,165,319 A * | 8/1979 | von der Crone et al. | 548/460 |
| 4,166,179 A | 8/1979 | Lotsch | |
| 4,262,120 A * | 4/1981 | von der Crone | 544/284 |
| 4,384,057 A | 5/1983 | von der Crone | |
| 4,400,507 A * | 8/1983 | von der Crone | 544/300 |
| 4,401,815 A * | 8/1983 | Lotsch et al. | 544/300 |
| 4,599,113 A * | 7/1986 | Lotsch et al. | 106/494 |
| 4,719,300 A * | 1/1988 | Lotsch | 544/284 |
| 4,723,023 A * | 2/1988 | Hahn et al. | 548/482 |
| 4,758,663 A | 7/1988 | Scherer | |
| 4,764,217 A * | 8/1988 | von der Crone et al. | 106/494 |
| 4,845,214 A * | 7/1989 | Lotsch et al. | 544/250 |
| 4,970,310 A * | 11/1990 | von der Crone | 544/284 |
| 5,091,532 A | 2/1992 | Kaletta | |
| 5,698,705 A * | 12/1997 | Alfter et al. | 548/305.4 |
| 5,716,446 A * | 2/1998 | Alfter et al. | 106/498 |
| 2007/0119345 A1 | 5/2007 | Kaul | |
| 2010/0003612 A1* | 1/2010 | Loebel et al. | 430/108.21 |

FOREIGN PATENT DOCUMENTS

| | | |
|---|---|---|
| DE | 1012406 B | 7/1957 |
| DE | 1025080 B | 2/1958 |
| DE | 2041999 A1 | 3/1972 |
| DE | 2628409 A1 | 1/1978 |
| DE | 2757982 B1 | 6/1979 |
| EP | 0029007 A | 5/1981 |
| EP | 0038548 A | 10/1981 |
| FR | 1537299 A | 8/1968 |
| WO | 9938920 A | 8/1999 |
| WO | 2005/085364 A | 9/2005 |

OTHER PUBLICATIONS

English Language Abstract of EP 0029007, May 1981.
English Language Abstract of EP 0038548, Oct. 1981.
English Language Abstract of DE 1025080, Feb. 1958.
Chem. Abst. No. 1972-16795T of DE 2041999, Nov. 1972.
Chem. Abst. No. 1968-01444Q of FR 1537299, Jan. 1968.
Chem. Abst. No. 1960:13793 of DE 1012406, Jul. 1957.

* cited by examiner

*Primary Examiner* — Anthony Green
(74) *Attorney, Agent, or Firm* — Qi Zhuo

(57) ABSTRACT

Pigment of formula wherein $R_1$ is $CONR_4R_5$ or $C(=NR_6)NR_7R_8$, $R_2$, $R_3$, $R_4$ and $R_5$ are each independently of the others H, $C_1$-$C_5$alkyl, or phenyl which is unsubstituted or substituted from 1 to 5 times by $C_1$-$C_5$alkyl or by halogen, $R_6$ is phenyl which is unsubstituted or substituted from 1 to 4 times by $C_1$-$C_5$alkyl or by halogen, $R_7$ is H or $C_1$-$C_5$alkyl, and $R_8$ is a direct bond or a carbonyl bridge to $R_6$, which pigment consists of primary particles the average aspect ratio of which is from 4 to 1, preferably from 3.5 to 1, especially from 3 to 1, and for the ellipses equivalent to the contours of the primary particles on a two-dimensional electron microscopic image have an average numerical eccentricity ϵ of from 0 to 0.80, the numerical eccentricity ϵ being defined as (formula), wherein a is the semimajor axis and b is the semiminor axis of the equivalent ellipse. That pigment preferably has a narrow particle size distribution and is, as are analogous pigments, prepared by a novel process. The invention relates also to a process for the preparation of that pigment, wherein $R_1CH_2CN$ or (formula) is dispersed in an acidic aqueous medium containing from 70 to 99% by weight water, preferably in the presence of a dispersant, and is reacted with solid (formula).

-continued
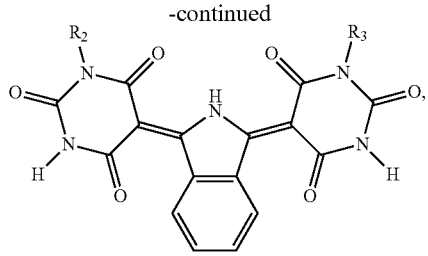
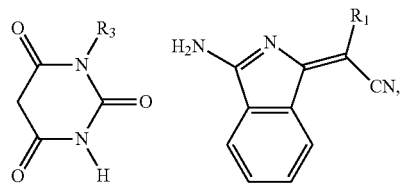
preferably
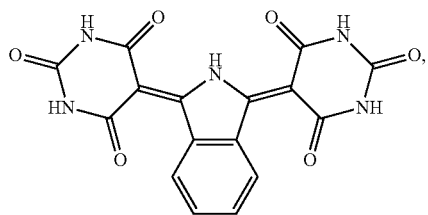
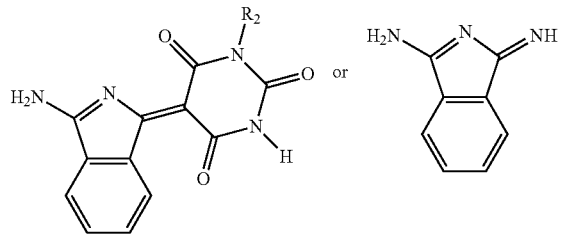
$$\varepsilon = \frac{\sqrt{a^2 - b^2}}{a}$$
15 Claims, 2 Drawing Sheets

ISOMETRIC ISOINDOLINE YELLOW PIGMENT

Isoindoline yellow (C.I. Pigment Yellow 139) has been known for a long time and is also commercially available from various manufacturers. On account of its unfavourable particle properties, such as brittleness and a strong tendency towards agglomeration, however, it is extraordinarily difficult to convert the crude product into a suitable pigment form using customary methods. Grinding, recrystallisation and/or salt kneading result in pigments which still leave something to be desired. The pigment forms known hitherto do not yet meet the ever increasing requirements in terms of opacity, tinctorial strength, colour saturation, green tinge, dispersibility, rheology and fastness to light and to weathering, especially in the coatings industry, to an entirely satisfactory degree.

DE-OS 2 041 999 discloses the synthesis of isoindoline yellow from diimino-isoindoline in a mixture of glacial acetic acid and dimethylformamide. Reference is made therein also to DE-AS 1 012 406 and DE-AS 1 025 080.

DE-OS 26 28 409 describes the synthesis of isoindoline yellow and other isoindoline pigments from 1-amino-3-imino-isoindolenine in an aqueous, acidic medium, it being optional to add from 5 to 400% by weight of a surface-active agent. The use of 1-amino-3-imino-isoindolenine in the form of a solution in ethylene glycol is said to be advantageous and is disclosed in combination with formic acid in all the Examples.

U.S. Pat. No. 5,091,532 discloses the synthesis of isoindoline yellow by reaction of phthalic acid dinitrile with an alcoholic base, then with a barbiturate at pH 1-6 in the presence of water.

It has now been found, surprisingly, that a substantially improved pigment form is obtained when isoindoline yellow is prepared in accordance with a novel process, it being possible for the crude product formed thereby to be further optimised by conditioning under particular conditions. Compared with pigments obtainable by the processes known hitherto, the resulting pigment is distinguished in particular by its more isometric primary particles and by a narrower particle size distribution. The optimum specific surface area of the pure pigment is approximately in the range of from 15 to 35 m²/g, especially from 20 to 25 m²/g.

The invention accordingly relates to a pigment of formula

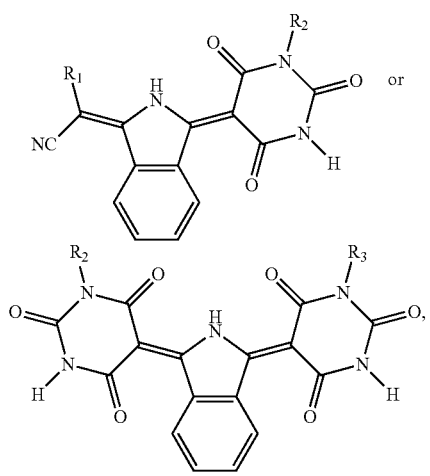

preferably

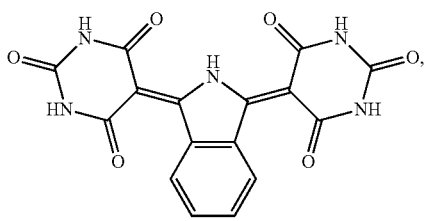

wherein $R_1$ is $CONR_4R_5$ or $C(=NR_6)NR_7R_8$,
$R_2$, $R_3$, $R_4$ and $R_5$ are each independently of the others H, $C_1$-$C_5$alkyl, or phenyl which is unsubstituted or substituted from 1 to 5 times by $C_1$-$C_5$alkyl or by halogen,
$R_6$ is phenyl which is unsubstituted or substituted from 1 to 4 times by $C_1$-$C_5$alkyl or by halogen, $R_7$ is H or $C_1$-$C_5$alkyl, and
$R_8$ is a direct bond or a carbonyl bridge to $R_6$,
which pigment consists of primary particles the average aspect ratio (shape factor) of which is from 4 to 1, preferably from 3.5 to 1, especially from 3 to 1, and/or the ellipses equivalent to the contours of the primary particles on a two-dimensional electron microscopic image have an average numerical eccentricity ε of from 0 to 0.80, the numerical eccentricity ε being defined as $$\varepsilon = \frac{\sqrt{a^2 - b^2}}{a},$$

wherein a is the semimajor axis and b is the semiminor axis of the equivalent ellipse.

Average aspect ratio and average numerical eccentricity are to be understood as being the respective arithmetic means for a representative amount of primary particles being evaluated, typically from 10 to 20 characteristic primary particles from 3 to 10 images.

The aspect ratio (shape factor) is the length-to-height ratio of the primary particles. The length-to-width ratio of the primary particles evaluated on a two-dimensional image is preferably from 2 to 1, although the numerical eccentricity is even more characteristic. The form factor and numerical eccentricity are advantageously determined by electron microscopy, wherein to determine the aspect ratio in a manner known per se to the person skilled in the art a metal-containing film is applied by vapour-deposition at an oblique angle to a specimen of the primary particles and the length of the shadow in the direction of vapour-deposition is measured. FIG. 1 shows electron microscopic images of four primary particles of a pigment according to the invention to which Pt/C has been applied by vapour-deposition at an angle of 40° to the supporting surface. The width of the shadow multiplied by the tangent of the shadowing angle (0.8391 in FIG. 1) gives the height of the primary particles. Those four typical primary particles have aspect ratios of from 1.7 to 3.5 with lengths of from 168 to 221 nm (the mean aspect ratio of this pigment is 2.26).

That technique is used routinely in the field of pigments. As a rule, the length is the largest dimension and the height is the smallest dimension of the particles. Even when that is exceptionally not the case, the aspect ratio is in any case always the ratio between the largest and the smallest dimensions of the particles.

For the numerical eccentricity, a standard image is used. Because the primary particles according to the invention usually have irregular, rounded contours, the numerical eccentricity ε of the equivalent ellipse is determined, the numerical eccentricity ε being defined as $$\varepsilon = \frac{\sqrt{a^2 - b^2}}{a},$$

wherein a is the semimajor axis and b is the semiminor axis of the equivalent ellipse.

The equivalent ellipse is an ellipse having the same surface area as a particle's view with a minimum total not overlapping surface area comprised between the outline of the ellipse and the contours of the particle. In the case of the pigment according to the invention, the mean numerical eccentricity ε, either independently of the averaged aspect ratio or, preferably, in combination with the averaged aspect ratio, is usually from 0 to 0.80, preferably from 0.05 to 0.80, especially from 0.45 to 0.75.

The primary particles can also be agglomerated or aggregated, but the individual primary particles of an agglomerate or aggregate are generally clearly identifiable (see Industrial Organic Pigments [1993], FIG. 3/p. 27, ISBN 3-527-28161-4). The aspect ratio and the numerical eccentricity generally relate in the case of agglomerates and aggregates not to the agglomerate or aggregate as a whole but to its identifiable primary particles which are agglomerated or aggregated. Aggregates in which no primary particles are clearly identifiable should be regarded as primary particles.

Agglomerates in which no primary particles are clearly identifiable should not be taken into consideration for determining the aspect ratio, although they often have a aspect ratio and a numerical eccentricity similar to those of the primary particles. Primary particles in the context of the invention are therefore not necessarily crystallographic monocrystals.

If the pigment is too highly flocculated or agglomerated, so that the aspect ratio cannot be determined with sufficient accuracy, then in the case of the pigments having a preferred particle size described hereinbelow, preferably in combination with the above-mentioned mean numerical eccentricity, the aspect ratio can exceptionally be left out of consideration.

Preferably, the pigment according to the invention contains ≧90% by weight particles ≦0.50 μm and ≧50% by weight particles≦0.40 μm, and in addition preferably ≧85% by weight particles ≧0.25 μm.

More especially, the pigment according to the invention contains ≧80% by weight particles≦0.45 μm and ≧60% by weight particles≦0.40 μm. Very especially, the pigment according to the invention contains ≧50% by weight particles≦0.38 μm.

Those particle sizes relate to primary particles and aggregated particles but exclude agglomerated particles.

Preferably the pigment according to the invention, in combination with the particle size, has a narrow particle size distribution, preferably ≧60% by weight of the primary particles being in the range $D_{max}$±75 nm, wherein $D_{max}$ denotes the particle size which corresponds to the maximum of the particle size distribution by weight; and/or
the fraction of medium primary particle size, excluding 16% by weight fines fraction and 16% by weight coarse fraction, having a spread of ≦130 nm, especially preferably
≧76% by weight of the primary particles being in the range $D_{max}$±75 nm and/or
the fraction of medium primary particle size, excluding 16% by weight fines fraction and 16% by weight coarse fraction, having a spread of ≦122 nm.

Also characteristic is the shape of the particle size distribution, the ratio of the proportion by weight of primary particles of size $D_{max}$ to the proportion by weight of primary particles of size 0.55 μm being ≧10, preferably ≧20, especially ≧40. That feature applies in combination with the particle sizes indicated above. Alternatively or in addition, it is also possible to use the ratio of the proportion by weight of primary particles of size $D_{max}$ to the proportion by weight of primary particles of size $D_{max}$+0.170 μm, which is generally ≧6, preferably ≧30. The proportions by weight of both particle sizes can be derived from the particle size distribution by weight.

Those various possible characterisation methods can be used singly or in combination with one another, but in the latter case there is generally considerable redundancy in the criteria.

For determining the primary particle size it is advantageous to use a well dispersed pigment suspension and a Joyce-Löbl disc centrifuge, the particles being assigned on a weight basis to fractions, for example each of 20 nm spread, the primary particle size being the equivalent diameter ("Equivalent Settling Rate Diameter" $x_w$). In comparison with previous products, the pigment according to the invention characteristically has an almost statistical particle size distribution (FIG. 5), while the previous products have a particle size distribution with a broad shallow curve in the region of the maximum frequency (FIG. 6). The person skilled in the art thus has an excellent opportunity to combine pigments according to the invention of different, selected particle sizes with one another purposively, for example in order to increase the opacity still further.

It will be understood that a large number of parameters can affect the results, so that were an experiment to be carried out in an unsuitable way it would even be possible to obtain false results, but the methodology described hereinbelow has proved to be especially advantageous and readily reproducible.

For dispersion and deagglomeration of the pigment, in a standard 200 ml glass vessel having a screw top, 2 g of pigment are stirred into 48 g of an alkyd coating consisting of 34.272 g of ALKYDAL® F310 (Bayer AG, D-Leverkusen, 60% by weight in SOLVENT-NAPHTHOL™), 10.848 g of xylene, 1.152 g of n-butanol, 1.152 g of 1-methoxy-2-propanol and 0.576 g of a solution of 1 part by weight of low molecular weight methylpoly-siloxane having a high proportion of volatile siloxanes (Baysilone® Paint Additive MA, Borchers GmbH, D-40764 Langenfeld) in 99 parts by weight of xylene.

100 g of 2 mm glass beads are then added and the vessel is shaken in a shaking apparatus (for example Skandex type) until it is ascertained by optical microscopy that the number of agglomerates larger than about 2 μm has become so low that the remaining agglomerates have no appreciable effect on the measurement results. It is preferable to use a 620 W BAS model apparatus (Lau GmbH, D-58675 Hemer) with which a large number of samples can be simultaneously dispersed and deagglomerated. That apparatus has a shaking frequency of about 619 per minute with a displacement of from 32 to 45 mm (depending on the loading). The dispersion and deagglomeration time is usually from 1 to 6 hours, preferably from 2 to 4 hours, especially 3 hours. Once complete dispersion and deagglomeration have been achieved, unnecessary prolongation of the dispersion and deagglomeration time should be avoided. By cooling with a current of air, the temperature is advantageously controlled in the range of about from 20 to 50° C.

1 g of the alkyd coating dispersion so obtained is then introduced into 19 g of a fluid mixture consisting of 323 mg of nitrocellulose containing 20% by weight plasticiser (low viscosity printing ink quality, degree of substitution ~2.0, ~11.1% N; 30% by weight in acetone give according to ISO 14446 a viscosity of 400 mPa·s according to Höppler; for example NC AH 27 chips containing 20% by weight acetyl tributyl citrate, Hagedorn NC GmbH/Osnabrück DE), 133 mg of ethylcellulose (low viscosity grade, 5% in toluene/ethanol 4:1 give a viscosity of 3-5.5 mPa·s in an Ubbelohde viscometer; for example ETHOCEL® Std. 4, Dow Europe GmbH/Horgen CH), 11.704 g of ethyl acetate, 2.223 g of 1-acetoxy-2-ethoxy-ethane and 4.617 g of toluene, and typically having a viscosity of 1.870 cP and a density of 0.932 g/cm³. After being stirred for 5 minutes, the mixture is treated for 1 minute with 100 W ultrasound at about 20-30° C., preferably using a Sonifier® B12 (Branson, Danbury Conn./USA) with external cooling with ice-water.

For measurement, 0.5 ml of the resulting suspension is injected in the customary way into a Joyce-Löbl disc centrifuge having a cavity of 10±1 cm diameter and 6±1 mm thickness at 10 000 rev/min, which is mostly filled with a fluid (spin fluid) consisting of 1.17% by weight nitrocellulose (as above), 0.48% by weight ethyl cellulose (as above), 42.41% by weight ethyl acetate, 8.06% by weight 1-acetoxy-2-ethoxy-ethane, 16.73% by weight toluene and 31.15% by weight perchloroethylene (viscosity ~1.7 cP/specific weight ~1.08 g/cm³). The particles are measured quantitatively by spectrophotometry in an almost peripheral position of the disc. The particle size is determined using the Stokes equation $$T = \frac{6.299 \times 10^9 \cdot \eta}{d^2 \cdot N^2 \cdot p} \cdot \mathrm{Log}_{10} \frac{R''}{R'}$$

wherein
T=centrifuging time in minutes;
d=particle size in μm;
N=number of revolutions per minute (=10 000);
p=difference in density between particles and prefilled fluid in mg/cm³;
η=viscosity of the fluid in Poise;
R″=radius at the peripheral measurement position of the disc in cm;
R′=radius at the injection position close to the centre of the disc in cm.

Such conditions will be familiar to the analyst skilled in the art. The specific weight of the pigment particles is known and is, for example, 1.73 g/cm³ for pure C.I. Pigment Yellow 139. That value should be used in cases of doubt.

Surprisingly, contrary to the teaching of DE-OS 26 28 409, the presence of a solubilizing amount of an organic solvent in the synthesis has now proved to be disadvantageous. On the contrary, the relatively isometric pigments according to the invention are advantageously obtained in an acidic aqueous medium in which 1-amino-3-imino-isoindolenine has relatively poor solubility. Surprisingly, this method is also valuable in the case of other isoindoline pigments of the methine type, such as C.I. Pigment Yellow 185, Pigment Orange 66, Pigment Orange 69 and Pigment Red 260.

The invention accordingly relates to a process for the preparation of a pigment of formula

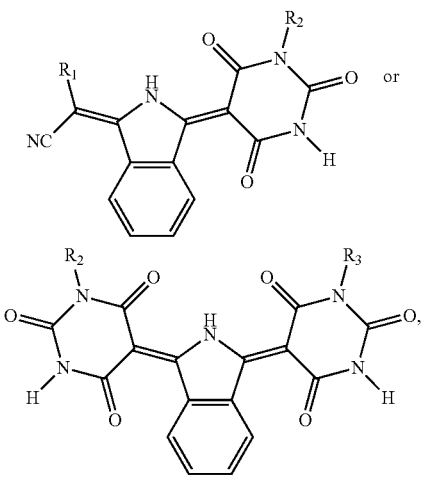

preferably

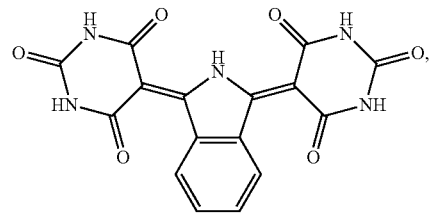

wherein $R_1$ is $CONR_4R_5$ or $C(=NR_6)NR_7R_8$, $R_2$, $R_3$, $R_4$ and $R_5$ are each independently of the others H, $C_1$-$C_5$alkyl, or phenyl which is unsubstituted or substituted from 1 to 5 times by $C_1$-$C_5$alkyl or by halogen, $R_6$ is phenyl which is unsubstituted or substituted from 1 to 4 times by $C_1$-$C_5$alkyl or by halogen, $R_7$ is H or $C_1$-$C_5$alkyl, and $R_8$ is a direct bond or a carbonyl bridge to $R_6$, wherein $R_1CH_2CN$ or

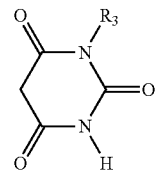

is dispersed in an acidic aqueous medium containing from 70 to 99% by weight water, preferably in the presence of a dispersant, and is reacted with solid

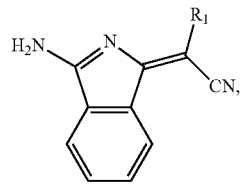

-continued

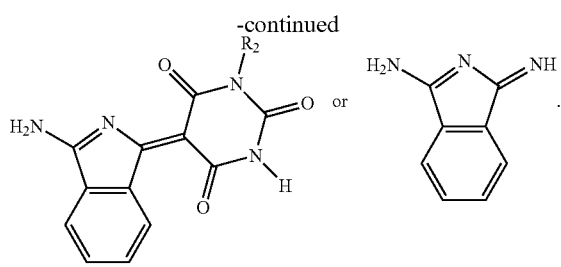

$R_1$ is preferably $CONR_4R_5$. $R_2$ and $R_3$ are preferably hydrogen. $R_4$ and $R_5$ are preferably phenyl which is unsubstituted or substituted from 1 to 5 times by $C_1$-$C_5$alkyl or by halogen. $C_1$-$C_5$Alkyl is, for example, methyl, ethyl, n-propyl, isopropyl, n-butyl, sec-butyl, isobutyl, tert-butyl, n-amyl or tert-amyl, preferably methyl. Halogen is Br, Cl, F or I, preferably Cl.

The stereochemistry of both exocyclic double bonds of the pigment can be, independently of one another, E or Z.

When solid 1-amino-3-imino-isoindolenine is added, either symmetrically substituted pigments or, for example by use of $R_1CH_2CN/R_9CH_2CN$ or

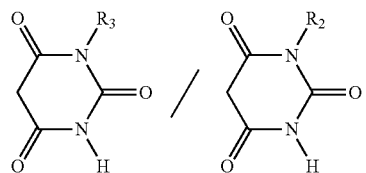

mixtures, pigment mixtures or solid solutions can be prepared,
wherein $R_9$ independently of $R_1$ has the same meanings as $R_1$, but with the proviso that $R_9$ is different from $R_1$.

The solid isoindole compounds of formula

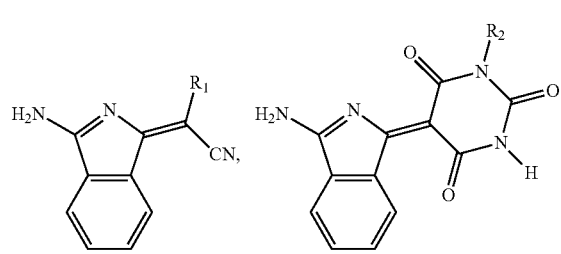

or

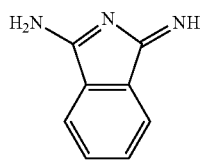

can be 100% or, preferably, can still contain a little residual moisture. Customary technical grades having purities of from 80 to 99% by weight, preferably from 90 to 98% by weight, are likewise suitable. The isoindole compounds can therefore be used in the form of dry or moist powders, in the form of a moist press cake or in the form of an aqueous dispersion. Dry or moist powders or a moist press cake are preferably added to the pre-prepared acidic medium. An aqueous dispersion can either be added to the pre-prepared acidic medium or can itself be used as initial charge, in which case the acidic medium is not added until afterwards.

For carrying out the process according to the invention the amount of acidic aqueous medium is immaterial provided it is sufficient to ensure normal stirring. It can be, for example, from 100% by weight to 10 000% by weight of the total amount of the two starting materials. As a rule, for practical reasons the person skilled in the art will use a 5- to 30-fold amount of acidic aqueous medium, based on the total amount of the two starting materials. Lower amounts render stirring more difficult, while higher amounts increase the filtration times unnecessarily.

An advantage of the process according to the invention is that 1-amino-3-imino-isoindolenine or its derivatives are not dissolved in the acidic medium, which otherwise results in the previous, undesirable anisometry (possibly caused by formation of secondary products and disruption of crystallisation). In addition to the water, the aqueous medium in which the cyanacetamide or barbituric acid starting material is dispersed contains advantageously from 1 to 30% by weight of an organic acid, especially from 1 to 25% by weight of an organic acid, preferably from 1 to 20% by weight formic or acetic acid, especially from 1 to 15% by weight formic or acetic acid, and preferably from 1 to 25% by weight of a dispersant, and optionally from 0 to 25% by weight of neutral organic substances and/or inorganic salts or acids. Those amounts are based on the total aqueous medium without the pigment starting materials. The amount of dispersant is preferably from 15 to 1000 g/mol of isoindole compound, especially from 70 to 800 g/mol of isoindole compound.

The pH value is preferably in the range of from 2.5 to 6.5, especially in the range of from 3.0 to 5.0. The temperature during the mixing of the reagents is advantageously from 0 to 100° C., preferably from 20 to 70° C., for example from 20 to 25° C. To complete the reaction, the temperature is then advantageously raised, preferably to from 30 to 120° C., especially to from 45 to 100° C., optionally under pressure.

Suitable organic acids are those having a water-solubility of at least 5 g per liter of water, especially sulfonic or carboxylic acids. Preference is given to organic acids having a water-solubility of at least 50 g per liter of water. Special preference is given to organic acids that have a water-solubility of 200 g or more per liter of water or that are fully miscible with water. Very special preference is given to acetic acid.

Dispersants are advantageously polyfunctional compounds having a molecular weight >320 Da, for example polyglycols or ethers thereof. Preference is given to dispersants containing aromatic sulfonic groups and the alkali and alkaline earth salts thereof. Special preference is given to dispersants obtained by condensation of aromatic compounds with formaldehyde.

Neutral organic substances are not necessary for the process according to the invention but can nevertheless be added in little to at most modest quantities if desired. Neutral organic substances can be, for example, customary solvents, such as alcohols or low molecular weight glycols, resins, for example resins containing abietic acid, such as colophonium, or antioxidants, light stabilisers, plasticisers, gloss improvers, fillers or siccatives. Neutral organic substances usually have a molecular weight of ≦320 Da but, provided they are not polyfunctional and are therefore to be classed as dispersants, they can also have a molecular weight of >320 Da, for example from 320 to 2000 Da.

The amount of neutral organic substances is preferably kept low in order not to increase the solubility of the starting materials in the reaction medium. Preferably the latter therefore contains from 0 to 15% by weight, especially from 0 to 10% by weight, more especially from 0 to 5% by weight, neutral organic substances.

Inorganic salts or acids can also optionally be added. By addition of sodium chloride, for example, the solubility of 1-amino-3-imino-isoindolenine or its derivatives in the reaction medium can be reduced so that the reaction takes place, as desired, to an even greater extent in the solid state. By addition of inorganic acids, the amount of organic acid can be reduced without the pH value being increased, in which case the organic acid acts as buffer. It is also possible, however, to add salts of organic acids intentionally for buffering.

The pigments according to the invention are preferably subjected to after-treatment. For after-treatment, the fully reacted reaction mixture containing the pigment is advantageously heated to a relatively high temperature, for example to from 40 to 200° C., optionally under pressure, preferably from 60 to 160° C., especially from 100 to 150° C. In accordance with a first type of procedure, the composition of the reaction mixture is not changed.

In accordance with a second, preferred type of procedure, before or during the after-treatment the composition of the reaction mixture is changed within the limits indicated for the reaction, for example by distilling off components and/or by dilution. The reaction mixture can also preferably be filtered and, for after-treatment, redispersed in a similar aqueous medium. As a result, secondary products which disrupt the desired formation of isometric particles are excluded from the after-treatment. In that second type of procedure, for the after-treatment it is also possible for the amount of neutral organic substances to be increased above the value indicated for the synthesis, for example up to 200% by weight, based on the amount of water.

The after-treatment, like the synthesis, can preferably be carried out in the presence of a dispersant, in which case the aspect ratio and the numerical eccentricity are further reduced. If, however, the aspect ratio and the numerical eccentricity already meet the desired requirements before after-treatment, preferably the amount of dispersant can be reduced in comparison with the synthesis or a dispersant can even be omitted altogether.

The after-treatment time is advantageously from 1 minute to 80 hours, preferably from ½ hour to 50 hours. For short after-treatment times it is advantageous to pass the suspension through a heated vessel (for example a tube). The use of a higher after-treatment temperature also enables the after-treatment time to be shortened. The after-treatment can of course also be carried out in several steps. The after-treatment is advantageously carried out at $pH \leq 7$, more especially at a pH of from 2 to 6.

After the synthesis or after the after-treatment, the pigment according to the invention is isolated in the customary way, for example by filtration, washing, optionally granulation, drying to the desired degree of moisture and optionally grinding or incorporating into a master batch. It is especially advantageous that the pigment according to the invention can be better filtered than pigments of the same chemical structure obtained by previously known processes. The pigment press cake can, however, alternatively be flushed in the conventional way or, for example, purified by means of a membrane process and spray-dried.

The pigments according to the invention can be used especially in the mass coloration of polymers. The invention therefore relates also to the use of a pigment according to the invention for mass-colouring a high molecular weight material and to a mass-coloured high molecular weight material containing from 0.01 to 70% by weight of a pigment according to the invention, based on the total coloured high molecular weight material.

The high molecular weight organic material to be coloured in accordance with the invention can be of natural or synthetic origin and usually has a molecular weight in the range of from $10^3$ to $10^8$ g/mol. It may be, for example, a natural resin or a drying oil, rubber or casein, or a modified natural substance, such as chlorinated rubber, an oil-modified alkyd resin, viscose, or a cellulose ether or ester, such as cellulose acetate, cellulose propionate, cellulose acetobutyrate or nitrocellulose, but is especially a completely synthetic organic polymer (either thermosetting plastics or thermoplastics), as are obtained by polymerisation, polycondensation or polyaddition, for example polycarbonate, polyester, such as polyethylene terephthalate or polybutylene terephthalate, polyolefins, such as polyethylene (HDPE, HDPE-HMW, HDPE-UHMW, LDPE, LLDPE, VLDPE, ULDPE), polypropylene or polyisobutylene, substituted poly-olefins, such as polymerisation products of vinyl chloride, vinyl acetate, styrene, acrylonitrile or acrylic acid and/or methacrylic acid esters, or butadiene, polystyrene or polymethyl methacrylate, and also copolymerisation products of the said monomers, especially acrylonitrile/butadiene/styrene (ABS), styrene/acrylonitrile (SAN) or EVA.

From the range of polyaddition resins and polycondensation resins there may be mentioned condensation products of formaldehyde with phenols, so-called phenoplasts, and condensation products of formaldehyde with urea, thiourea and melamine, so-called aminoplasts, the polyesters used as coating resins, either saturated, such as alkyd resins, or unsaturated, such as maleic resins, and also linear polyesters and polyamides or silicones.

Furthermore, the high molecular weight organic material can be a binder for coatings or printing inks, such as boiled linseed oil, nitrocellulose, alkyd resins, melamine resins, urea-formaldehyde resins, acrylic resins or other hardenable or polymerisable precursors.

The said high molecular weight compounds can be used alone or in mixtures, in the form of plastic compositions, solutions or melts, which can optionally be spun to form fibres. It may be a ready-to-use composition or an article formed therefrom, or a masterbatch, for example in the form of granules. Optionally, for colouring high molecular weight organic materials in accordance with the invention it is also possible to use customary additives, which may be contained in the uncoloured organic material or can be added during incorporation.

Examples of such additives are stabilisers, such as antioxidants, UV stabilisers or light stabilisers, surfactants, wetting agents, plasticisers or texture improvers. When texture improvers are desired, they are optionally added preferably to the pigments according to the invention as early as during synthesis or during after-treatment.

Texture improvers are, for example, fatty acids having at least 12 carbon atoms, such as, especially, stearic or behenic acid, stearic or behenic acid amide, salts of stearic or behenic acid, such as magnesium, zinc or aluminium stearate or behenate, also quaternary ammonium compounds, such as, especially, tri($C_1$-$C_4$)alkylbenzyl-ammonium salts, such as trimethyl-, triethyl-, tri-n-propyl-, tri-isopropyl-, tri-n-butyl-, tri-sec-butyl- and tri-tert-butyl-benzylammonium salts, and also plasticisers, such as epoxidised soybean oil, waxes, such as polyethylene wax, resin acids, such as abietic acid, colophonium soap, hydrogenated or dimerised colophonium, ($C_{12}$-$C_{18}$)-paraffindisulfonic acid, alkylphenols and alcohols, such as stearyl alcohol, also lauryl amine or stearyl amine, and/or aliphatic 1,2-diols, such as 1,2-dodecanediol.

Preferred texture improvers are lauryl amine and stearyl amine, aliphatic 1,2-diols, stearic acid and its amides, salts and esters, epoxidised soybean oil, waxes and resin acids.

Such additives can be added, for example, advantageously in amounts of from 0.05 to 25% by weight, preferably from 0.5 to 15% by weight, based on the composition according to the invention, before, during or after the preparation thereof.

The pigmenting of the high molecular weight organic substances with the pigments according to the invention is carried out, for example, by admixing such a colorant, optionally in the form of a masterbatch, with the substrates using roll mills or mixing or grinding apparatus. The coloured material is then generally brought into the desired final form by methods known per se, such as by calendering, compression moulding, extrusion, coating, spraying, casting, printing or injection moulding. It is often desirable, in order to produce non-rigid mouldings or to reduce their brittleness, to incorporate so-called plasticisers into the high molecular weight compounds prior to shaping. As plasticisers there may be used, for example, esters of phosphoric acid, of phthalic acid or of sebacic acid. In the process according to the invention, the plasticisers may be incorporated into the polymers before or after incorporation of the pigment dye. It is also possible, in order to achieve different colour shades, to add to the high molecular weight organic materials, in addition to the pigment compositions, also fillers or other colour-imparting constituents, such as white, coloured or black pigments as well as effect pigments, in the respective desired amount.

The admixing of the pigment can also be effected immediately prior to the actual processing step, for example by continuously feeding a pulverulent colorant according to the invention and, at the same time, a granulated high molecular weight organic material, and optionally also additional ingredients, such as, for example, additives, directly into the intake zone of an extruder, where mixing takes place immediately before processing. Generally, however, it is preferable to mix the colorant into the high molecular weight organic material beforehand, since more uniform results can be achieved.

For colouring coatings and printing inks, the high molecular weight organic materials and the colorants according to the invention are finely dispersed or dissolved, optionally together with additives, such as stabilisers, dispersants, gloss improvers, fillers, other pigments, siccatives or plasticisers, generally in an organic and/or aqueous solvent or solvent mixture. It is possible to use a procedure in which the individual components are dispersed or dissolved separately or in which a plurality thereof are dispersed or dissolved together and only then all of the components combined.

Coatings are applied, for example, by dipping, knife application, film drawing, brush application or spraying, the coatings according to the invention being formed after drying and hardening, advantageously thermally or by irradiation. Further methods of application that result in coatings are powder coating and coil coating methods, all the details of which are known per se to the person skilled in the art.

When the high molecular weight material to be coloured is a coating, it may be a customary coating or a speciality coating, for example an automotive finish. The coating may be a constituent of a multi-layer finish. Effect finishes can be obtained by addition of metal flakes, uncoated or coated mica and/or interference pigments. The advantages of the pigments according to the invention are particularly striking in coating applications, such as, for example, increased tinctorial strength combined simultaneously with relatively high opacity. All the requirements discussed in the introduction are met surprisingly well.

Preferably the coating according to the invention is additionally provided, as protection, with a clear lacquer of customary thickness which comprises, for example, one or more UV absorbers or is tinted with transparent colour pigments or includes effect pigments. If the coating according to the invention is located on a metal substrate, that substrate is preferably primed, it having been found, surprisingly, that the colour of the primer plays an insignificant role. The colour result on a white, black or grey primer is so good that, unlike conventional coatings, it is especially advantageously unnecessary to apply a yellow primer. A grey primer will therefore usually be preferred for practical reasons.

The coatings according to the invention offer a surprisingly high tinctorial strength with high colour saturation. The hiding power, despite a relatively low pigment concentration, is excellent; using an alkyd/melamine mass-tone finish in a dry layer thickness of ~45 μm containing 4.0 g/m² of colour pigment on standard black card (L*=29.4, C*=2.8, h=43.2) there are obtained preferably a brightness L*≧61.5, a colour saturation C*≧60.5 and a hue h≧68.0, especially a brightness L*≧62.0, a colour saturation C*≧61.0 and a hue h≧69.8, more especially a brightness L*≧62.5, a colour saturation C*≧61.5 and a hue h≧70.0. The colour difference ΔE*(contrast) between that coating over black and the same coating over a white primer (L*=94.2, C*=4.9, h=282.4) is likewise astonishingly small and is preferably ≦26.0, very especially ≦25.5.

The improvement in the aspect ratio surprisingly achieved by the process according to the invention makes it possible for a specific hiding power to be achieved using less pigment and for a higher hiding power to be achieved with the same tinctorial strength. In contrast, hitherto it was possible to increase the hiding power only by increasing the particle size, which resulted, however, in an undesirable reduction in tinctorial strength and in a more reddish hue. In the case of the particles having the aspect ratio according to the invention, the particle size corresponding to an optimum hiding power advantageously lies at a significantly lower value than in the case of the particles known hitherto.

For measuring the coloristic values it is preferable to use samples which have been carefully sieved through a metal screen by hand using a pestle, with mesh sizes of from 0.35 to 0.50 mm being the most advantageous.

By varying the components and the concentration thereof it is possible to obtain hues in a wealth of shades from green-tinged yellow to reddish orange. The light, weathering and heat stabilities are excellent, as are the coating properties, such as, for example, good rheology and high gloss.

Printing inks of generally known compositions are applied by customary methods, for example by letterpress printing (flexographic printing), planographic printing (offset printing, lithographic printing), intaglio printing (rotogravure, steel engraving), screen printing or ink-jet printing (piezo or vapour bubble methods), for example to paper, card, metal, wood, leather, plastics or textiles, for publications, illustrations, packaging, banknotes, logistics documents or decoration. Further ink compositions can be used in ballpoint pens and felt-tip pens as well as in ink pads, ink ribbons and ink cartridges.

The person skilled in the art is expressly advised as a matter of routine to try out any plastics, coating or printing ink compositions known to him, for example those which are the subject of published patent applications or those which are commercially available, even when he does not have precise knowledge of their compositions.

In addition to the mass-colouring of high molecular weight organic materials in the form of plastics, coatings and printing inks, the colorants according to the invention are also suitable, for example, for the production of solid toners, wax transfer ribbons or colour filters.

All procedures and preferences apply especially in combination with one another.

Figure 1:
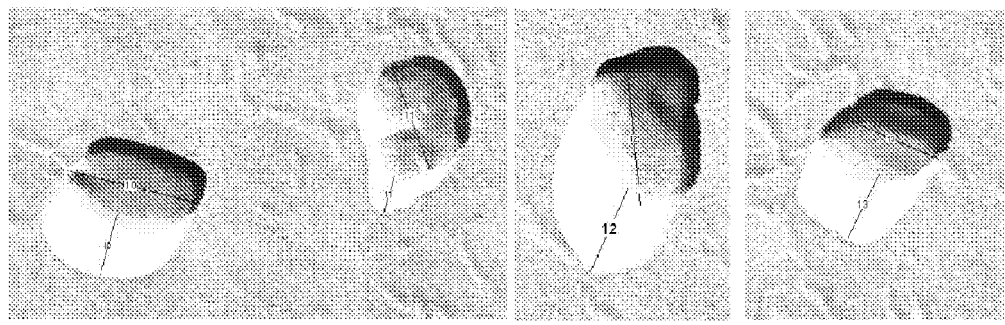
FIG. 1 shows electron microscopic images of four primary particles of a pigment according to the invention to which Pt/C has been applied by vapour-deposition at an angle of 40° to the supporting surface.
Figure 2:
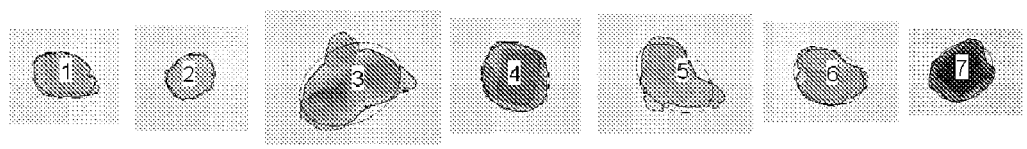
FIG. 2 shows seven characteristic particles of a pigment according to the invention, obtainable in accordance with Example 9, with the equivalent ellipses. These seven particles have a mean numerical eccentricity of 0.63.
Figure 3:
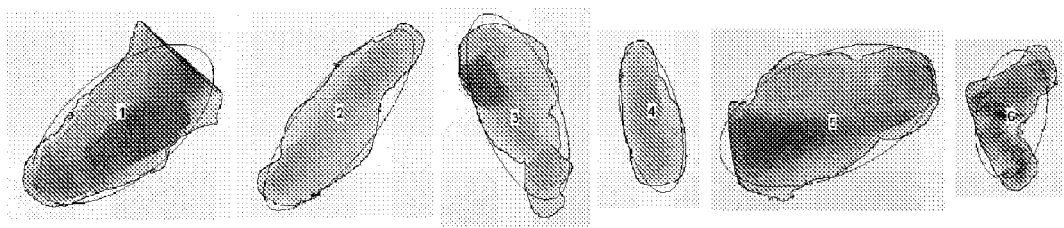
FIG. 3 shows six characteristic particles of PALIOTOL® Yellow L 2140 HD. These six particles have a mean numerical eccentricity of 0.88.

The following Examples illustrate the invention but do not limit the scope thereof (unless otherwise indicated, "%" is always % by weight):

EXAMPLE 1

71.7 g of barbituric acid are suspended in a mixture of 71.1 g of glacial acetic acid and 1400 g of water. 44.0 g of solid 1-amino-3-imino-isoindolenine (92° A) technical grade) are then added in the course of 30 minutes. After one hour, the mixture is heated to 90° C. and after 7 hours' subsequent stirring is cooled again to 20-25° C. The yellow-orange suspension is filtered and washed with water. 297 g of yellow press cake containing 95 g of C.I. Pigment Yellow 139 are obtained.

EXAMPLE 2

191 g of yellow C.I. Pigment Yellow 139 press cake according to Example 1 are dispersed in 477 g of water and the pH is adjusted to 3.0 with 8 g of acetic acid. The suspension is treated under pressure at 120° C. for 9 hours, then cooled to 20-25° C. and filtered. The residue is washed with water, dried at 80° C./5·10³ Pa and finely pulverised (yield: 52 g).

In an alkyd/melamine mass-tone coating (dry film ~45 μm, 4.0 g/m² of colour pigment) this pigment yields a high colour saturation (C*=84.5) and a green-tinged hue (h=63.7). In reduction (0.2% colour pigment, 3.8% white pigment), a high tinctorial strength (L*=85.2), a high colour saturation (C*=47.9) and a very green-tinged hue (h=67.0) are obtained. Mean numerical eccentricity=0.70.

EXAMPLE 3

71.7 g of barbituric acid are suspended in a mixture of 71.1 g of glacial acetic acid and 1400 g of water. An aqueous solution containing 20.7 g of a polymeric reaction product of naphthalenesulfonic acid and formaldehyde is then added thereto and stirring is carried out for 30 minutes at 23° C. 40.6 g of solid 1-amino-3-imino-isoindolenine are then added in the course of 30 minutes. After one hour, the mixture is heated to 90° C. and then stirred for 7 hours. After adjustment of the pH to 4.0 with acetic acid, the yellow-orange suspension is treated under pressure at 120° C. for 12 hours, then cooled to 20-25° C. and filtered. The residue is washed with water, dried at 80° C./5·10³ Pa and finely pulverised (yield: 90 g).

In an alkyd/melamine mass-tone coating (dry film ~45 μm, 4.0 g/m² of colour pigment) this pigment yields a high colour saturation (C*=81.6), a green-tinged hue (h=63.8) and a high opacity (ΔTr=−3.3). In reduction (0.2% colour pigment, 3.8% white pigment) a high tinctorial strength (L*=84.2), a high colour saturation (C*=47.5) and a green-tinged hue (h=65.3) are obtained.

EXAMPLE 4

71.7 g of barbituric acid are suspended in a mixture of 71.1 g of glacial acetic acid and 1400 g of water. A concentrated aqueous solution containing 20.7 g of a polymeric reaction product of naphthalenesulfonic acid and formaldehyde is added thereto and stirring is carried out for 30 minutes at 23° C. 40.6 g of solid 1-amino-3-imino-isoindolenine are then added in the course of 30 minutes. After one hour, the mixture is heated to 90° C. and after 7 hours' subsequent stirring is cooled again to 20-25° C. The yellow-orange suspension is filtered and washed with water. 297 g of yellow press cake are obtained containing 95 g of C.I. Pigment Yellow 139, which is distinguished by a narrow particle size distribution and, after drying, a very high tinctorial strength in coating applications.

EXAMPLE 5

191 g of yellow C.I. Pigment Yellow 139 press cake according to Example 4 are dispersed in 477 g of water and the pH is adjusted to 3.0 with 8 g of acetic acid. The suspension is treated under pressure at 120° C. for 9 hours, then cooled to 20-25° C. and filtered. The residue is washed with water, dried at 80° C./5·10³ Pa and finely pulverised (yield: 52 g).

In an alkyd/melamine mass-tone coating (dry film ~45 μm, 4.0 g/m² of colour pigment) in comparison with Paliotol® Yellow L 2140 HD this pigment yields a higher colour saturation (ΔC*=1.8), a more green-tinged hue (ΔH*=1.6) and a higher opacity (ΔTr=−3.3). The opacity is also higher than in Example 2 (ΔTr=−4.7). In the same application, in comparison with Paliotol® Yellow L 2140 HD this pigment exhibits in reduction (0.2% colour pigment, 3.8% white pigment) a 21% higher tinctorial strength with a higher colour saturation (ΔC*=2.8) and a more green-tinged hue (ΔH*=1.9).

EXAMPLE 6

71.7 g of barbituric acid are suspended in a mixture of 71.1 g of glacial acetic acid and 1400 g of water. 100 g of dialkyl-naphthalenesulfonic acid are added thereto and stirring is carried out for 30 minutes at 23° C. 40.6 g of solid 1-amino-3-imino-isoindolenine are then added in the course of 30 minutes. After one hour, the mixture is heated to 90° C. and after 7 hours' subsequent stirring is cooled again to 20-25° C.

The yellow-orange suspension is filtered and washed with water. 308 g of yellow press cake are obtained containing 98.6 g of C.I. Pigment Yellow 139, which is distinguished by a narrow particle size distribution and, after drying, a very high tinctorial strength in coating applications.

EXAMPLE 7

191 g of yellow C.I. Pigment Yellow 139 press cake according to Example 6 are dispersed in 477 g of water and the pH is adjusted to 3.0 with 8 g of acetic acid. The suspension is treated under pressure at 120° C. for 9 hours, then cooled to 20-25° C. and filtered. The residue is washed with water, dried at 80° C./5·10³ Pa and finely pulverised (yield: 48 g).

In an alkyd/melamine mass-tone coating (dry film ~45 μm, 4.0 g/m² of colour pigment) in comparison with Paliotol® Yellow L 2140 HD this pigment yields a higher colour saturation ($\Delta C^*=0.8$) and a more green-tinged hue ($\Delta H^*=3.1$). The opacity is also higher than in Example 2 ($\Delta Tr=-1.0$). In the same application, in comparison with Paliotol® Yellow L 2140 HD this pigment exhibits in reduction (0.2% colour pigment, 3.8% white pigment) a 42% higher tinctorial strength with a much higher colour saturation ($\Delta C^*=4.7$) and a very much more green-tinged hue ($\Delta H^*=4.5$).

EXAMPLE 8

358.7 g of barbituric acid are suspended in a mixture of 355.5 g of glacial acetic acid and 7000 g of water. A concentrated aqueous solution containing 51.3 g of a polymeric reaction product of naphthalenesulfonic acid and formaldehyde is added thereto and stirring is carried out for 30 minutes at 23° C. 203.2 g of solid 1-amino-3-imino-isoindolenine are then added in the course of 30 minutes. After one hour, the mixture is heated to 90° C. and after 7 hours' subsequent stirring is cooled again to 20-25° C. The yellow-orange suspension is filtered and washed with water. 1850 g of yellow press cake are obtained containing 462.5 g of C.I. Pigment Yellow 139, which is distinguished by a narrow particle size distribution and, after drying, a very high tinctorial strength with good opacity in coating applications.

EXAMPLE 9

71.7 g of barbituric acid are suspended in a mixture of 71.1 g of glacial acetic acid and 1400 g of water. An aqueous solution containing 72.0 g of a polymeric reaction product of naphthalenesulfonic acid and formaldehyde is added thereto and stirring is carried out for 30 minutes at 23° C. 40.6 g of solid 1-amino-3-imino-isoindolenine are then added in the course of 30 minutes. After one hour, the mixture is heated to 90° C. and then stirred for 7 hours. After adjustment of the pH to 4.0 with acetic acid, the yellow-orange suspension is treated under pressure at 120° C. for 12 hours, then cooled to 20-25° C. and filtered. The residue is washed with water, dried at 80° C./5·10³ Pa and finely pulverised (yield: 90 g).

In an alkyd/melamine mass-tone coating (dry film ~45 μm, 4.0 g/m² of colour pigment) this yellow pigment yields an especially high tinctorial strength.

EXAMPLE 10

240 g of yellow C.I. Pigment Yellow 139 press cake according to Example 8 are dispersed in 460 g of water and the pH is adjusted to 3.0 with 8 g of acetic acid. The suspension is treated under pressure at 120° C. for 9 hours, then cooled to 20-25° C. and filtered. The residue is washed with water, dried at 80° C./5·10³ Pa and finely pulverised (yield: 50.4 g).

In an alkyd/melamine mass-tone coating (dry film ~45 μm, 4.0 g/m² of colour pigment) in comparison with Paliotol® Yellow L 2140 HD this pigment yields a higher colour saturation ($\Delta C^*=2.7$), a more green-tinged hue ($\Delta H^*=1.6$) and a higher opacity ($\Delta Tr=-1.7$). In the same application, in comparison with Paliotol® Yellow L 2140 HD this pigment exhibits in reduction (0.2% colour pigment, 3.8% white pigment) a 30% higher tinctorial strength.

EXAMPLE 11

71.7 g of barbituric acid are suspended in a mixture of 71.1 g of glacial acetic acid and 1400 g of water. A concentrated aqueous solution containing 207 g of a polymeric reaction product of naphthalenesulfonic acid and formaldehyde is added thereto and stirring is carried out for 30 minutes at 23° C. 40.6 g of solid 1-amino-3-imino-isoindolenine are then added in the course of 30 minutes. After one hour, the mixture is heated to 90° C. and after 7 hours' subsequent stirring is cooled again to 20-25° C. The yellow-orange suspension is filtered and washed with water. 297 g of yellow press cake containing 95 g of C.I. Pigment Yellow 139 are obtained.

EXAMPLE 12

191 g of yellow C.I. Pigment Yellow 139 press cake according to Example 11 are dispersed in 477 g of water and the pH is adjusted to 3.0 with 8 g of acetic acid. The suspension is treated under pressure at 120° C. for 9 hours, then cooled to 20-25° C. and filtered. The residue is washed with water, dried at 80° C./5·10³ Pa and finely pulverised (yield: 50 g).

In an alkyd/melamine mass-tone coating (dry film ~45 μm, 4.0 g/m² of colour pigment) in comparison with Paliotol® Yellow L 2140 HD this pigment yields a higher colour saturation ($\Delta C^*=0.9$), a more green-tinged hue ($\Delta H^*=2.8$) and a higher opacity ($\Delta Tr=-1.9$). In the same application, in comparison with Paliotol® Yellow L 2140 HD this pigment exhibits in reduction (0.2% colour pigment, 3.8% white pigment) a 46% higher tinctorial strength combined with higher colour saturation ($\Delta C^*=5.3$) and a more green-tinged hue ($\Delta H^*=2.9$).

EXAMPLES 13-22

The procedure is carried out analogously to Examples 4 and 5 but instead of the concentrated aqueous solution containing 20.7 g of a polymeric reaction product of naphthalenesulfonic acid and formaldehyde the following additives are used:

| Example | Amount [g] | Additive |
| --- | --- | --- |
| 13 | 2.6 | lauryl sulfate |
| 14 | 10.4 | p-toluenesulfonic acid |
| 15 | 10.4 | n-phenylphosphonic acid |
| 16 | 10.4 | Emulphor ™ OPS 25 |
| 17 | 10.4 | Klucel ™ Typ E |
| 18 | 10.4 | p-toluenesulfonic acid |
| 19 | 10.4 | n-phenylphosphonic acid |
| 20 | 10.4 | Emulphor OPS 25 |
| 21 | 1.6 | EFKA ® 6250 |
| 22 | 1.0 | EFKA ® 4330 |

Good pigments are obtained in all those Examples, the particle sizes and the particle size distributions in each case lying within the limits indicated above. The pigments of Examples 14 to 22 are, in addition, considerably more green-tinged than Paliotol® Yellow L 2140 HD.

EXAMPLE 23

3.6 g of barbituric acid are suspended in a mixture of 7.1 g of glacial acetic acid and 140 g of water. 16.4 g of a concentrated aqueous solution containing a polymeric reaction product of naphthalenesulfonic acid and formaldehyde is added thereto and then 6.3 g of solid 3-(cyano-N-methylcarbamoyl-methylene)-1-imino-isoindoline are added. After 30 minutes, the mixture is heated to 90° C. and after 7 hours' subsequent stirring is cooled again to 20-25° C. The yellow-orange suspension is filtered and washed with water. 19 g of yellow press cake are obtained, containing 8.5 g of C.I. Pigment Yellow 185, of which 9.4 g are dried at 80° C./5·10³ Pa and finely pulverised (yield: 3.9 g).

EXAMPLE 24

Figure 4:
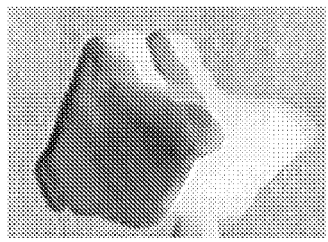
FIG. 4 shows an electron microscopic image of a typical primary particle of C.I. Pigment Yellow 185 prepared according to the invention.
Figure 5:
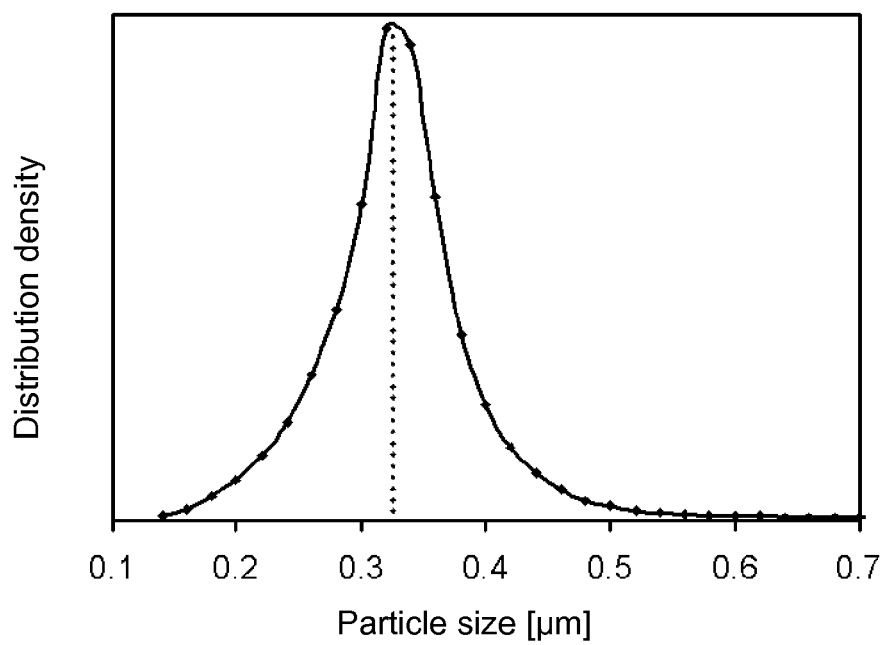
FIG. 5 shows the characteristic particle size distribution by weight of a pigment according to the invention, obtainable according to Example 9, with the by weight prevalent fraction $D_{max}$ being indicated by a dotted line.
Figure 6:
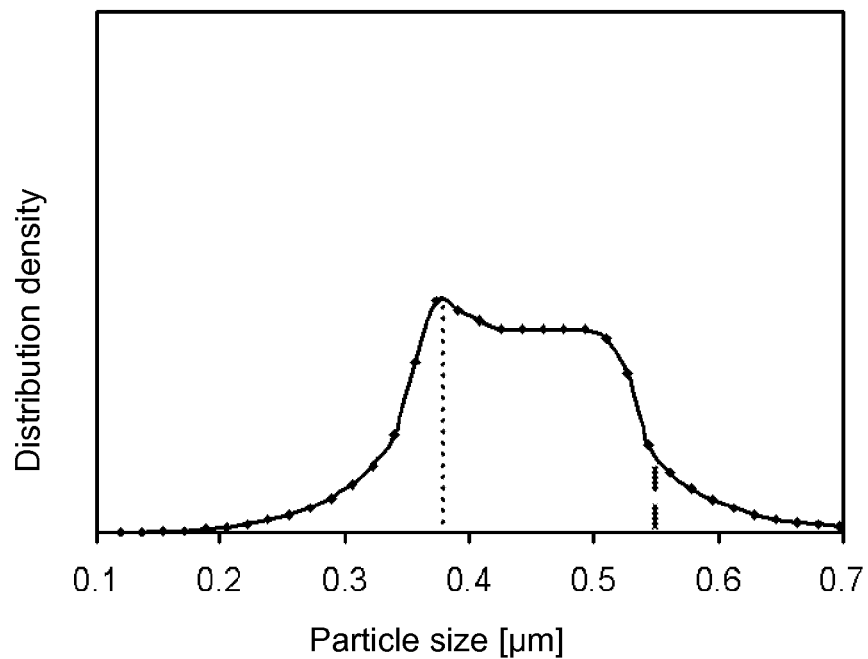
FIG. 6 shows the particle size distribution by weight of PALIOTOL® Yellow L 2140 HD. The scale for the distribution density is the same scale as in FIG. 5, with the by weight prevalent fraction $D_{max}$ being indicated by a dotted line and the fraction of size 0.55 μm being indicated by a dashed line.

9.6 g of yellow C.I. Pigment Yellow 185 press cake according to Example 23 are dispersed in 70 g of water and the pH is adjusted to 3.0 with 0.2 g of acetic acid. The suspension is treated at reflux temperature under normal pressure for 18 hours, then cooled to 20-25° C. and filtered. The residue is washed with water, dried at 80° C./5·10³ Pa and finely pulverised (yield: 4 g). The mean particle size (Joyce-Löbl) of the resulting pigment is 0.50 μm. FIG. 4 shows an electron microscopic image of a typical primary particle, to which Pt/C has been applied by vapour-deposition at an angle of 40° to the supporting surface, having a aspect ratio of 2.65, a numerical eccentricity of 0.72 and a length-to-width ratio of 1.44.

EXAMPLES 25-26

0.4 g of the products according to Examples 23 and 24 are each mixed with 13.3 g of PVC (Evipol® SH 7020, EVC GmbH) and 7.3 ml of stabiliser mixture consisting of 92.21% by weight DIDP Vestinol® (Hüls Chemie), 4.19% by weight Rheoplast® 39 (Ciba Inc.) and 3.6% by weight IRGASTAB® BZ561 (Ciba Inc.) and the resulting mixture is processed into thin films in customary manner on a two-roller apparatus for 15 minutes at 160° C. Films having good opacity and the following colour values are obtained:

| Example | L* | C* | h |
|---|---|---|---|
| 25 | 74.8 | 79.1 | 74.4 |
| 26 | 74.8 | 78.1 | 74.1 |

EXAMPLE 27

51.2 g of barbituric acid are suspended in a mixture of 39.6 g of glacial acetic acid, 56.8 g of a polymeric reaction product of naphthalenesulfonic acid and formaldehyde (45%) and 906 g of water and heated at 60° C. An aqueous dispersion, heated to 35° C., containing 34.8 g of solid 1-amino-3-imino-isoindolenine (90%), 56.8 g of a polymeric reaction product of naphthalenesulfonic acid and formaldehyde (45%) and 220 ml of 1 M sodium hydroxide solution is added thereto. After 15 minutes, the mixture is heated to 98° C. and after 7 hours' subsequent stirring is cooled again to 20-25° C. The yellow-orange suspension is filtered and washed with water. 174.2 g of yellow press cake containing 55.8 g of C.I. Pigment Yellow 139 are obtained, of which 10.2 g are dried at 80° C./5·10³ Pa, finely pulverised and sieved. The remaining 164 g of yellow press cake are dispersed in 700 g of water and the pH is adjusted to 3.0 with 6.0 g of acetic acid. The suspension is treated under pressure at 125° C. (internal temperature) for 9 hours, then cooled to 20-25° C. and filtered. The residue is washed with water, dried at 80° C./5·10³ Pa, finely pulverised and sieved. The mean particle size (Joyce-Löbl) of the resulting tinctorially strong, opaque pigment (ΔE*white/black=18.2/40 μm alkyd/melamine mass-tone, 8% pigment) is 0.23 μm with a aspect ratio of 3.74 and a numerical eccentricity of 0.80. 96% of the particles are of a size≦0.50 μm, the ratio of the weight of primary particles of size 0.23 μm to the weight of primary particles of size 0.55 μm is 101, the ratio of the weight of primary particles of size 0.23 μm to the weight of primary particles of size 0.40 μm is 43, 83% of the primary particles have a size of 0.23 μm±75 nm and the fraction excluding 16% by weight fines fraction and 16% by weight coarse fraction has a spread of 105 nm. In alkyd/melamine coatings (mass-tone 8% colour pigment and reduction 0.8% colour pigment, 7.2% white pigment) the pigment has the following values:

| | L* | C* | h |
|---|---|---|---|
| Mass-tone | 72.1 | 84.4 | 64.4 |
| Reduction | 82.3 | 63.6 | 69.2 |

EXAMPLE 28

The procedure is analogous to Example 27, but with the difference that the pigment cake from the synthesis is dried slightly to only 75 g using air suction and the resulting product is conditioned with only 5.3 g of acetic acid. The mean particle size (Joyce-Löbl) of the resulting tinctorially strong, opaque pigment (ΔE*white/black=17.27/40 μm alkyd/melamine mass-tone, 8% pigment) is 0.25 μm with a aspect ratio of 3.23 and a numerical eccentricity of 0.73. In alkyd/melamine coatings (mass-tone 8% colour pigment and reduction 0.8% colour pigment, 7.2% white pigment) the pigment has the following values:

| | L* | C* | h |
|---|---|---|---|
| Mass-tone | 72.1 | 84.1 | 64.6 |
| Reduction | 82.2 | 63.4 | 69.2 |

EXAMPLE 29

51.2 g of barbituric acid are suspended in a mixture of 39.6 g of glacial acetic acid, 56.8 g of a polymeric reaction product of naphthalenesulfonic acid and formaldehyde (45%) and 906 g of water and heated at 60° C. An aqueous dispersion, heated to 35° C., containing 34.8 g of solid 1-amino-3-imino-isoindolenine (90%), 56.8 g of a polymeric reaction product of naphthalenesulfonic acid and formaldehyde (45%) and 220 ml of 1 M sodium hydroxide solution is added thereto. After 15 minutes, the mixture is heated to 98° C. and after 14 hours' subsequent stirring is cooled again to 20-25° C. 1 liter of the resulting yellow-orange suspension is adjusted to pH 3.0 with 30 g of acetic acid. The suspension is treated under pressure at 125° C. (internal temperature) for 9 hours, then cooled to 20-25° C. and filtered. The residue is washed with water, dried at 80° C./5·10³ Pa, finely pulverised and sieved (yield: 42 g). The average particle size (Joyce-Löbl) of the resulting, very tinctorially strong, opaque pigment (ΔE*white/black=12.63/40 μm alkyd/melamine mass-tone, 8% pigment) is 0.28 μm with a aspect ratio of 2.99 and a numerical eccentricity of 0.70. 95% of the particles are of a size≦0.50 μm, the ratio of the weight of primary particles of size 0.28 μm to the weight of primary particles of size 0.55 μm is 105, the ratio of the weight of primary particles of size≦0.28 μm to the weight of primary particles of size 0.55 μm is 56, 78% of the primary particles have a size of 0.28 μm±75 nm and the fraction excluding 16% by weight fines fraction and 16% by weight coarse fraction has a spread of 111 nm.

In alkyd/melamine coatings (mass-tone 8% colour pigment; reduction 0.8% colour pigment, 7.2% white pigment) the pigment has the following values:

|  | L* | C* | h |
|---|---|---|---|
| Mass-tone | 69.9 | 79.3 | 64.9 |
| Reduction | 81.4 | 62.5 | 68.6 |

EXAMPLE 30

The procedure is analogous to Examples 4 and 5, but instead of the glacial acetic acid the same amount of formic acid is used. An opaque pigment (ΔE*white/black=15.20/40 μm alkyd/melamine mass-tone, 8% pigment) of mean particle size 0.29 μm (Joyce-Löbl) with a aspect ratio of 3.13 and a numerical eccentricity of 0.69 is obtained, which pigment, in an alkyd/melamine coating reduction (0.8% colour pigment, 7.2% white pigment), yields coloristic values very similar to the pigment according to Example 5:

| Example | L* | C* | H |
|---|---|---|---|
| 5 | 81.97 | 66.00 | 68.88 |
| 30 | 81.98 | 65.15 | 69.17 |

99% of the particles are of a size≦0.38 μm, the ratio of the weight of primary particles of size 0.29 μm to the weight of primary particles of size 0.55 μm is 111, the ratio of the weight of primary particles of size 0.29 μm to the weight of primary particles of size 0.56 μm is 57, 89% of the primary particles have a size of 0.29 μm±75 nm and the fraction excluding 16% by weight fines fraction and 16% by weight coarse fraction has a spread of 90 nm.

EXAMPLE 31

The procedure is analogous to Examples 4 and 5, but 450 g of propionic acid are used instead of the glacial acetic acid. A pigment of mean particle size 0.33 μm (Joyce-Löbl) with a aspect ratio of 2.97 and a numerical eccentricity of 0.66 is obtained, which pigment, in an alkyd/melamine coating reduction (0.8% colour pigment plus 7.2% white pigment), has 33% higher tinctorial strength in comparison with the pigment according to Example 30 but has a distinctly different hue and reduced hiding power (ΔE*white/black=22.32):

| Example | Particle size | L* | C* | H |
|---|---|---|---|---|
| 31 | 0.33 μm | 81.95 | 69.40 | 73.25 |

COMPARISON EXAMPLE 1

(analogous to Example 2 of DE-OS 2628409): 103.2 g of barbituric acid are suspended in a mixture of 94.9 g of glacial acetic acid and 1000 g of water. An aqueous solution containing 7.2 g of a polymeric reaction product of naphthalene-sulfonic acid and formaldehyde is added thereto and stirring is carried out for 30 minutes at 23° C. 49.9 g of phthalic acid dinitrile are suspended in 382 g of ethylene glycol and ammonia gas is introduced until a homogeneous solution is obtained which in the course of 30 minutes is added to the barbituric acid suspension. After one hour, the mixture is heated to 100° C. and subsequently stirred for 4 hours. The yellow-orange suspension is then cooled to 20-25° C. and filtered. The residue is washed with water and dried at 80° C./5·10³ Pa. 22.8 g of a brown mass are obtained, which contains only 65% C.I. Pigment Yellow 139 and is difficult to disperse.

In an alkyd/melamine mass-tone coating (dry film ~45 μm, 4.0 g/m² of colour pigment) in comparison with Paliotol® Yellow L 2140 HD this pigment yields a much lower colour saturation. In the same application, in comparison with Paliotol® Yellow L 2140 HD this pigment exhibits in reduction (0.2% colour pigment, 3.8% white pigment) a similar tinctorial strength.

COMPARISON EXAMPLE 2

51.2 g of barbituric acid are suspended in a mixture of 39.6 g of glacial acetic acid and 906 g of water and heated at 60° C. An aqueous dispersion, heated to 35° C., containing 34.8 g of solid 1-amino-3-imino-isoindolenine (90%) and 220 ml of 1 M sodium hydroxide solution is added thereto. After 15 minutes, the mixture is heated to 98° C. and after 7 hours' subsequent stirring is cooled again to 20-25° C. The yellow-orange suspension is filtered and washed with water. The yellow press cake (361 g containing 52 g of C.I. Pigment Yellow 139) is dispersed in 732 g of water and the pH is adjusted to 3.0 with 8.4 g of acetic acid. The suspension is treated under pressure at 125° C. (internal temperature) for 9 hours, then cooled to 20-25° C. and filtered. The residue is washed with water, dried at 80° C./5·10³ Pa, finely pulverised and sieved. 31 g of a pigment of mean particle size 0.31 μm (Joyce-Löbl) are obtained, which pigment, however, in 4% mass-tone both on a black background and on a white background, exhibits brightness, colour saturation and hue values (L*C*h) that are in each case from 1 to 3 units lower and has 30% lower tinctorial strength than the pigments according to Examples 5 and 30. The primary particles have a aspect ratio of 4.33 and an average numerical eccentricity ε of 0.90, with a particle size distribution that is much wider than pigments according to the invention.

What is claimed is:

1. A pigment of formula

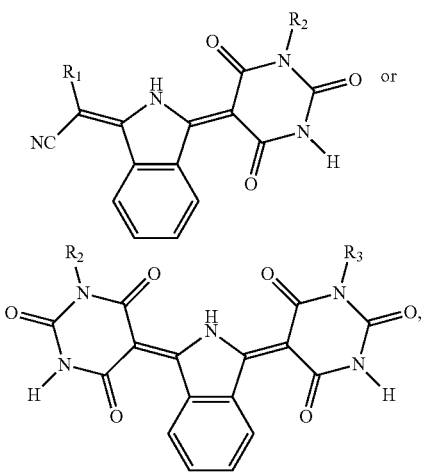

wherein $R_1$ is $CONR_4R_5$ or $C(=NR_6)NR_7R_8$, $R_2$, $R_3$, $R_4$ and $R_5$ are each independently of the others H, $C_1$-$C_5$alkyl, or phenyl which is unsubstituted or substituted from 1 to 5 times by $C_1$-$C_5$alkyl or by halogen, $R_6$ is phenyl which is unsubstituted or substituted from 1 to 4 times by $C_1$-$C_5$alkyl or by halogen, $R_7$ is H or $C_1$-$C_5$alkyl, and $R_8$ is a direct bond or a carbonyl bridge to $R_6$, which pigment consists of primary particles having an average aspect ratio from 4 to 1, and/or having an average numerical eccentricity $\epsilon$ of from 0 to 0.80, the numerical eccentricity $\epsilon$ being defined as $$\varepsilon = \frac{\sqrt{a^2 - b^2}}{a},$$

wherein a is the semimajor axis and b is the semiminor axis of the equivalent ellipse;

wherein the pigment contains $\geq 90\%$ by weight particles $\leq 0.50$ μm and $\geq 50\%$ by weight particles $\leq 0.40$ μm.

2. A pigment according to claim 1, containing $\geq 80\%$ by weight particles $\leq 0.45$ μm and $\geq 60\%$ by weight particles $\leq 0.40$ μm.

3. A pigment according to claim 1, wherein the ratio of the proportion by weight of primary particles of size $D_{max}$ to the proportion by weight of primary particles of size 0.55 μm is $\geq 10$, wherein $D_{max}$ denotes the article size which corresponds to the maximum of the particle size distribution by weight.

4. A pigment according to claim 1, wherein the ratio of the proportion by weight of primary particles of size $D_{max}$ to the proportion by weight of primary particles of size $D_{max}$ +0.170 μm is $\geq 6$.

5. A pigment according to claim 1, wherein $\geq 60\%$ by weight of the primary particles are in the range $D_{max}$ ±75 nm.

6. A pigment according to claim 1, which consists of primary particles having the average aspect ratio of which is from 3.5 to 1, and an average numerical eccentricity $\epsilon$ of from 0.05 to 0.80.

7. The pigment according to claim 1, wherein pigment is a compound of formula

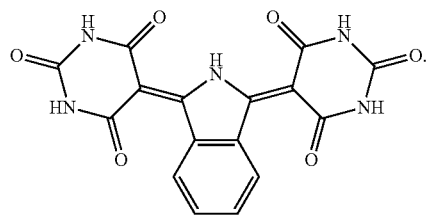

8. A mass-coloured high molecular weight material containing from 0.01 to 70% by weight, based on the total coloured high molecular weight material, of a pigment according to claim 1.

9. A method of mass-colouring a high molecular weight material comprising the step of mixing of the pigment according to claim 1 to the high molecular weight material.

10. A process for the preparation of a pigment of formula

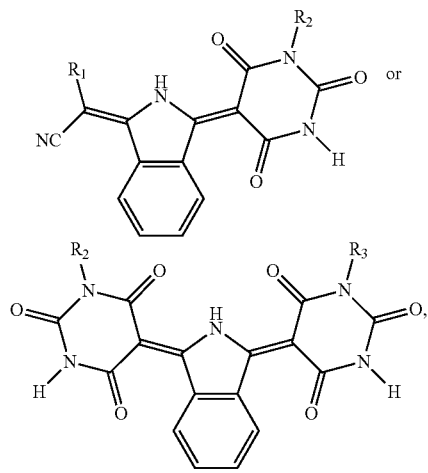

wherein $R_1$ is $CONR_4R_5$ or $C(=NR_6)NR_7R_8$, $R_2$, $R_3$, $R_4$ and $R_5$ are each independently of the others H, $C_1$-$C_5$alkyl, or phenyl which is unsubstituted or substituted from 1 to 5 times by $C_1$-$C_5$alkyl or by halogen, $R_6$ is phenyl which is unsubstituted or substituted from 1 to 4 times by $C_1$-$C_5$alkyl or by halogen, $R_7$ is H or $C_1$-$C_5$alkyl, and $R_8$ is a direct bond or a carbonyl bridge to $R_6$, wherein $R_1CH_2CN$ or

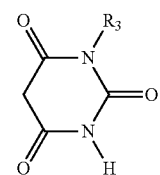

is dispersed in an acidic aqueous medium containing from 70 to 99% by weight water in the presence of a dispersant, and is reacted with solid

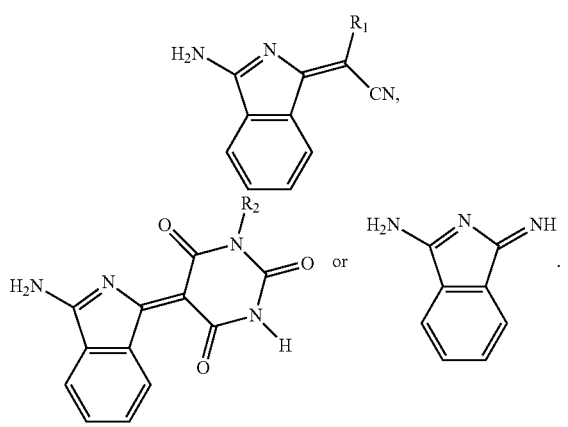

to obtain a reaction mixture.

11. A process according to claim 10, wherein the pH value is in the range of from 2.5 to 6.5.

12. A process according to claim 10, wherein the acidic aqueous medium contains an organic acid having a water-solubility of at least 5 g per liter of water, the dispersant is a polyfunctional compound having a molecular weight >320 Da, and the reaction mixture contains from 0 to 10% by weight neutral organic substances.

13. A process according to claim 10, wherein the dispersant comprises aromatic sulfonic groups and alkali and alkaline earth salts thereof and is obtained by condensation of aromatic compounds with formaldehyde.

14. A process according to claim 10, wherein the reaction mixture containing the pigment is heated to a temperature of from 40 to 200° C. after the reaction is completed, optionally under pressure.

15. The process according to claim 10, wherein the pigment prepared is a compound of formula

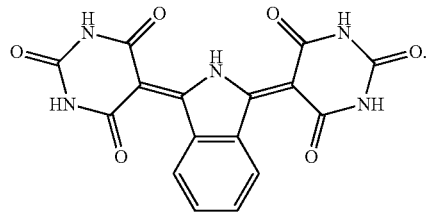

* * * * *